United States Patent

Knap

[11] 4,087,064
[45] May 2, 1978

[54] ORBITAL PROPULSION APPARATUS

[76] Inventor: George Knap, 4408 Wildwood Crescent, Burnaby, British Columbia, Canada, V5G 2M4

[21] Appl. No.: 820,146

[22] Filed: Jul. 29, 1977

Related U.S. Application Data

[63] Continuation-in-part of Ser. No. 727,036, Sep. 27, 1976, abandoned, which is a continuation-in-part of Ser. No. 623,388, Oct. 17, 1975, abandoned, which is a continuation of Ser. No. 452,078, Mar. 18, 1974, abandoned.

[51] Int. Cl.² .............................................. B64G 1/20
[52] U.S. Cl. .................................... 244/172; 74/84 S; 244/62
[58] Field of Search ............... 244/158, 167, 169, 172, 244/62; 74/84 S

[56] References Cited
U.S. PATENT DOCUMENTS 3,423,755   1/1969   Lassen et al. ................ 244/158 X Primary Examiner—Barry L. Kelmachter
Attorney, Agent, or Firm—Carver and Company

[57] ABSTRACT

Orbital propulsion apparatus which has a rotor drivable by an electric motor and upon which is mounted a plurality of mass members for movement radially of the axis of the rotor, each mass member having a rocket motor mounted thereon which, when fired, moves its associated mass member outwards against a compression spring mounted on the rotor so that at a predetermined angular velocity of rotor the mass members rotate in a common circular orbit, the rockets being controllable so that they can be fired through an arc of predetermined angularity so as to move each mass member radially outwards of its circular orbit to increase the centrifugal force of each mass member across the arc while the electric motor operates to maintain constant angular velocity of the rotor.

1 Claim, 8 Drawing Figures

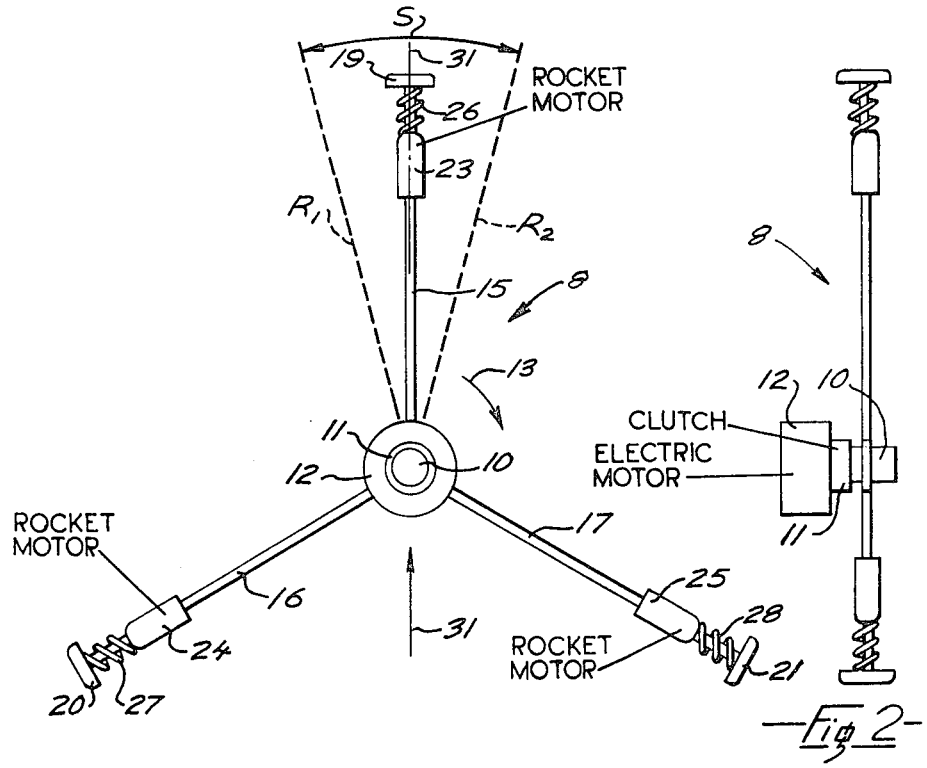
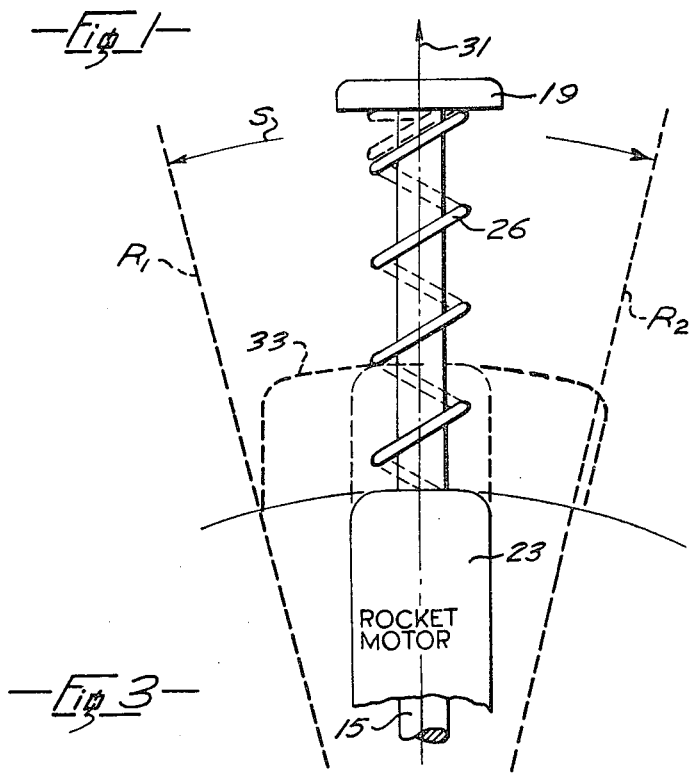

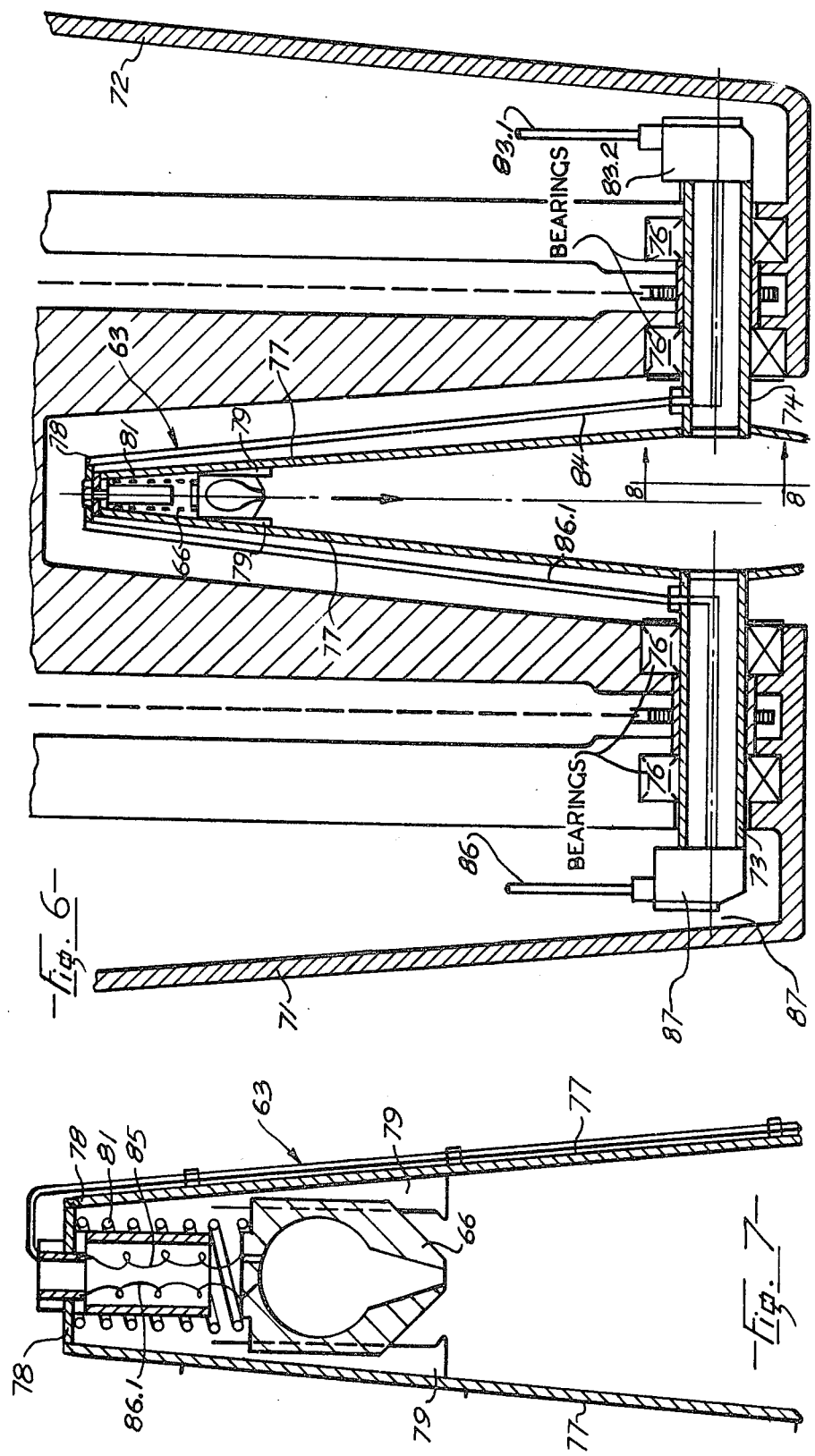

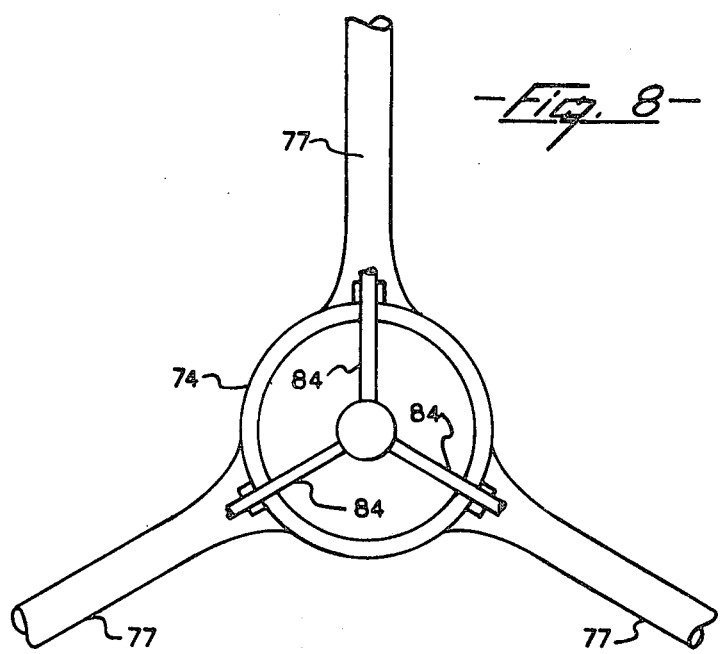

ORBITAL PROPULSION APPARATUS

CROSS REFERENCES TO OTHER APPLICATIONS

This is a Continuation-in-Part of my application Ser. No. 727,036 filed Sept. 27, 1976 entitled ORBITAL PROPULSION APPARATUS, now abandoned which is a continuation-in-part of Ser. No. 623,388, Oct. 17, 1975, now abandoned, which is a continuation of Ser. No. 452,078, Mar. 18, 1974, now abandoned.

BACKGROUND OF THE INVENTION

Field of the Invention

This invention relates to propulsion apparatus particularly directed to but not limited to apparatus for propelling vehicles in airless regions.

Propulsion apparatus for travel in airless regions, at the present date, is limited to chemically fueled reaction engines, namely rockets. Although this type of engine is efficient, weight and volume of rocket fuel necessarily limits the range and payload of vehicles propelled in this manner.

Unless use can be made of energy developed by atomic reaction to afford a propulsive effect, space craft will only be able to travel a relatively short distance away from the earth. To date no reaction engine has been developed utilizing the energy released by atomic reaction. Engines, however, have been developed where an energy released by atomic reaction in the form of heat can be utilized to provide electrical energy.

SUMMARY OF THE INVENTION

The present invention provides propulsive apparatus wherein electrical energy developed through atomic or similar reactions can be utilized to effectively aid in propulsion of vehicles in airless regions.

In the apparatus of the present invention orbital diameters or orbiting masses in balance are selectively shifted to provide increased centrifugal force in a selected direction and tendency of increased orbital diameter of the orbiting masses to result in a decrease in angular velocity is overcome by force applied by an electric motor the energy of which can be developed through atomic reaction. As atomic fuel has little mass relative to the energy available the vehicle propelled by the present invention can have a range much in excess of vehicles propelled solely by rocket fuels.

A detailed description following related to the drawings gives exemplification of apparatus according to the invention which, however, is capable of expression in means other than those particularly described and illustrated.

DESCRIPTION OF THE DRAWINGS

FIG. 1 is a front elevation, mainly diagrammatic, of one embodiment of the propulsion apparatus in accordance with the invention, FIG. 2 is a side view thereof, FIG. 3 is an enlarged front elevation detailing a portion of the apparatus shown in FIG. 1, FIGS. 4 and 5 are side and plan sectional views, mainly diagrammatic, showing another embodiment of the invention, FIG. 6 is a sectional side view, much enlarged, of a portion of the apparatus shown in FIGS. 4 and 5, FIG. 7 is a portion of FIG. 6, much enlarged, FIG. 8 is a section taken on Line 8—8 of FIG. 6.

DETAILED DESCRIPTION

Figure 4:
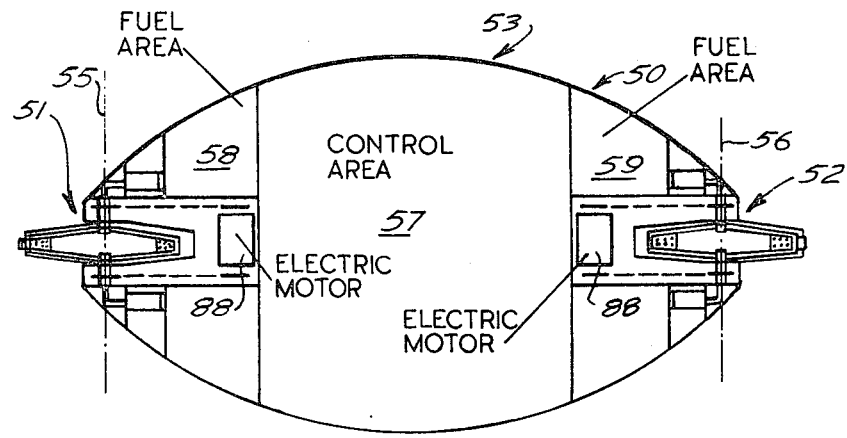

Referring to the drawings and particularly to FIGS. 1 and 2 one embodiment 8 propulsion apparatus in accordance with the invention has a rotor, generally 9, having a hub 10 suitably mounted for rotation on the vehicle, not shown, to be propelled, the hub being connected through an overriding clutch 11 to an electric motor 12. The clutch permits the motor to drive the hub uni-directionally, shown by the arrow 13.

Electric power for driving the electric motor is provided, preferably, by a nuclear reactor and attendent generating components which, for example, can be the type now in use for driving atomic powered submarines and the like. The electrical generating equipment is, of course, carried in the craft to be propelled.

Three rods 15, 16 and 17 extend radially from the hub and terminate in stops 19, 20 and 21. The rods which are of equal length are symmetrically disposed about the hub.

Rocket motors and mass members 23, 24 and 25 are mounted on the rods 15, 16 and 17 respectively for slideable movement longitudinally of the rods. Compression springs 26, 27 and 28 are mounted over the rods between the mass members thereon and the stops. The rocket motors which carry their own fuel are arranged so that when fired the rockets exert a thrust radially outwards. The rockets are all of the same weight and the springs are identical. The rockets are of a type which can be fired intermittently, control of period and location of firing being obtained by suitable controls within the vehicle.

OPERATION

In operation, the rotor is driven by operation of the electric motor until the rotor reaches a predetermined angular velocity. The rockets and mass members, through centrifugal action are moved outwards against the springs compressing the latter slightly to rotate in a common circular orbit. As the weight of the rocket and mass members and strength of the springs are the same, centrifugal forces balance each other so that the apparatus is in a state of equilibrium.

In order to achieve movement of the propulsion apparatus and with it the vehicle in a direction indicated by the arrow 31 each of the rockets is fired, in turn, as it passes through an arc S of its orbit the extent of which is defined by lines of radius R1 and R2 which subtend an arc of about 20° bisected by the line 31 representing the direction of proposed travel. Thrust generated by each rocket, as it is fired, moves each associated mass member from its normal position, as shown in solid outline in FIG. 3, radially outwardly along its rod to an extended position shown in broken outline in FIG. 3, thus increasing its orbital radius, the extended orbit being defined by the broken line 33. Normally, with inertia constant, increase in orbital radius of each rocket and mass member, will result in a decrease of angular velocity, however, constant angular velocity is maintained through operation of the electric motor during the period in which the firing rocket passes through the orbital arc S. When each rocket ceases firing as it leaves arc S the spring will again return the rocket and mass member to its normal orbit.

Propulsive effect, it is seen, is gained, not only from the thrust of each rocket but also from increased centrifugal force of the rocket and mass members due to the increased orbital speed of each rocket as it passes through the arc S. The increased centrifugal force along line 31 is equal to the energy output of the electric motor during the passage of each rocket and a mass member through the arc S.

Operational effectiveness is largely dependent upon synchronous relationship of its many parts, however, for optimum effectiveness, angular velocity, angle of orbital arc S, natural frequency of the springs and periodic operation of the electric motor should be so related so as to take advantage of cumulative effect of cooperating parts operating at resonant frequencies.

Another embodiment 50 of the invention is shown in FIGS. 4 through 8.

Figure 5:
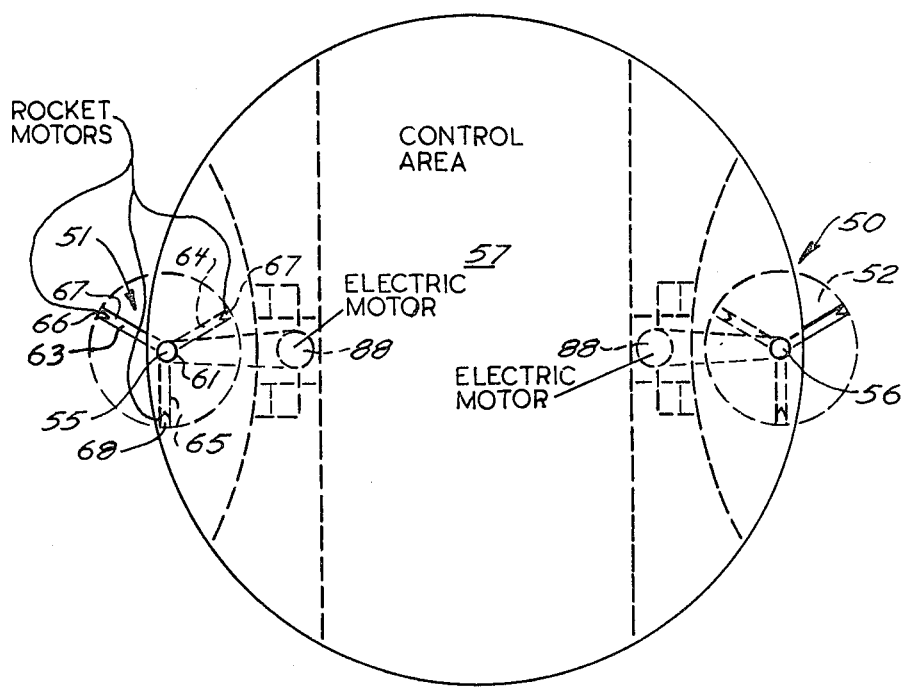

Referring to FIGS. 4 and 5 a pair of orbital propulsion motors 51 and 52 are shown mounted in a craft 53 on parallel axes 55 and 56. The craft as shown has a control area 57 and fuel areas 58 and 59 at ends of the craft.

The motor 51 has a hub 61 to which is secured three symmetrically arranged radial arms 63, 64 and 65. Rocket engines 66, 67 and 68 which are identical in structure and weight are mounted on the arms 63, 64 and 65, respectively.

FIGS. 6 and 7 show, in detail, one of the arms 63 together with rocket engine 66 of the propulsion motor 51 mounted for rotation between a pair of spaced brace members 71 and 72 extending from the hull of the craft. The hub of the motor 51 comprises a pair of hollow axles 73 and 74 mounted for rotation in bearings 76 secured to the brace members 71 and 72. The arm 63 is formed of a pair of spaced outwardly converging struts 77, one of the struts having a rigid connection to the axle 73 and the other strut having a rigid connection to the axle 74 and are connected at their outer ends by a bridging piece 78.

A pair of parallel rails 79 — 79 are secured to the struts near the outer ends thereof and slideably support the rocket engine for radial movement. A compression spring 81 fits between the rocket engine 66 and the bridging piece 78. Rocket fuel is delivered from the fuel tanks in the craft to the rocket engine 66 through a conduit 83.1 which is connected to a swivel 83.2 at one end of the axle 74 thence through a conduit 84 which extends through the axle and outwardly along the arm 63 and thence by flexible conduits 85 to the rocket engine. Electrical power to the rocket engine 66 is fed through lines 86 which are connected to a rotary connector 87 on the axle 73 thence through lines 86.1 extending through the axle 73 and along the arm 63 to the rocket engine. The arms 64 and 65 and the rocket engines thereon together with fuel and electrical lines are as described with reference to the arm 63.

Blast from the rocket engines it is seen passes between the axles 73 and 74 while thrust of the rocket engines is radially outward against their respective compression springs.

The axles of the motors 51 and 52 are connected for driving engagement to electric motor 88 mounted in the craft. The motor 52 is identical to motor 51 and, consequently, it is not considered a detailed description thereof is required. Period of operation of the electric motors, delivery of fuel to the rockets and fuel ignition can be controlled by controls within the craft such that the rocket engines can be fired through any desired arc as the rotors rotate.

Operation of embodiment 50 is the same as described with reference to embodiment 8. In embodiment 50, however, provision of the motors provides balance control of the craft for operation thereof in any direction about an axis parallel to the axes of the rotors. Control of attitude of the craft so as to alter its direction of travel can be effected by operation of control rockets fed by the same fuel as used by the rocket motors 51 and 52. These control rockets are not shown as such devices are of common knowledge.

I claim:
1. Orbital propulsion apparatus comprising:
   (a) a rotor having a rotational axis,
   (b) a plurality of arms radiating from the rotor,
   (c) a mass member mounted on each arm for rotation therewith and freely movable longitudinally of each arm,
   (d) yieldable resilient means reacting against the outer end of each arm and each mass member normally urging the mass members radially inwards for resiliently restraining radial outward movement of the mass members so that the mass members normally rotate in a common circular orbit when the rotor rotates at a pre-determined velocity,
   (e) a reaction motor mounted on each mass member for urging each mass member to move radially outwards against the action of its associated resilient means, each said motor being controllable for effecting its operation through an arc of predetermined angularity,
   (f) motor means drivingly connected to the rotor and synchronized with operation of the reaction motors to maintain rotor speed constant so that the mass members return, under the action of the resilient means, to the common circular orbit when the reaction motors cease operation.

* * * * *